United States Patent
Aymar, deceased

[15] 3,645,495
[45] Feb. 29, 1972

[54] SOLENOID ACTUATED FLEXIBLE FLAPPER VALVE

[72] Inventor: Julian Robert Aymar, deceased, late of N. Merrick, N.Y. by Michael R. Aymar, administrator

[73] Assignee: Surgical Dynamics Inc., Berkeley Heights, N.J.

[22] Filed: Jan. 9, 1970

[21] Appl. No.: 1,728

[52] U.S. Cl. ............................................251/129, 251/138
[51] Int. Cl. .......................................................F16k 31/06
[58] Field of Search ..........................251/138, 129; 137/523

[56] References Cited

UNITED STATES PATENTS

| | | | |
|---|---|---|---|
| 1,515,353 | 11/1924 | Martin | 251/129 X |
| 2,534,987 | 12/1950 | Price | 251/129 X |
| 2,610,796 | 9/1952 | Marshall, Jr. | 251/129 X |
| 3,102,712 | 9/1963 | Zilk | 251/138 X |

*Primary Examiner*—Arnold Rosenthal
*Attorney*—Darby & Darby

[57] ABSTRACT

A low-cost valve is provided comprising a molded plastic body in which the movable armature of a solenoid acts against a valve flapper defined by a thin flexible disk. When the solenoid is energized the armature displaces the disk and opens the valve.

9 Claims, 4 Drawing Figures

Patented Feb. 29, 1972 3,645,495

INVENTOR.
JULIAN ROBERT AYMAR
BY Leonard H. King
ATTORNEY

SOLENOID ACTUATED FLEXIBLE FLAPPER VALVE

This invention relates generally to valves and more particularly to a low cost-solenoid actuated flapper valve.

BACKGROUND OF THE INVENTION.

There are many applications for valves of the class to which this invention is directed. For the purpose of this discussion, and without tending to be limiting, the present invention will be described in connection with apparatus such as described in my issued U.S. Pat. No. 3,392,412. In the aforementioned patent there is disclosed a bed rest having bellows adapted to be placed under a mattress and filled with air compressed by a switch actuated motor. When the bellows are to be collapsed, the motor switch is also used to energize a solenoid in order to bleed the air from the bellows. In structure of this type, cost is a very important consideration. While the valve shown in the aforementioned patent is very effective for the purposes intended, I have found that I can simplify the construction and reduce the cost without sacrificing any efficiency.

The present invention is characterized by a slotted, molded plastic body in which a solenoid is mounted. The solenoid is suitably connected to a source of electrical energy so that, when energized, the armature moves linearly and thereby displaces a flexible disk that lies in a plane transverse to the axis of the armature. When the armature and the disk are displaced the interior of the bellows is in communication with the interior of the valve. The slots in the valve body thereby permit bleeding of the compressed air that was in the bellows.

The various valve sections, which, are, except for the solenoid, molded from a suitable high-impact plastic, are secured together by means of a conventional adhesive means. A spacer is used within the valve to prevent linear movement of the solenoid bobbin when the solenoid is energized. The resilient flapper is captured between axially adjacent parts of the valve and is prevented from angular movement by arcuate ribs in one of the valve body components cooperating with an arcuate slot in the flapper. Means are provided for mounting the valve on the motor housing and means are provided for connecting the valve to the utilization device, which, in the embodiment illustrated is a bellows of a bed rest.

Accordingly, it is an object of this invention to provide an improved valve.

It is another object of this invention to provide an improved flapper valve.

A further object of this invention is to provide an improved solenoid actuated flapper valve.

A particular object of this invention is to provide a low-cost solenoid actuated flapper valve that is usable with a compressor motor.

A feature of this invention is that return springs for the solenoid armature are not required.

These and other objects, features, and advantages of the invention will, in part, be pointed out with particularly, and will, in part, become obvious from the following more detailed description of the invention, taken in conjunction with the accompanying drawing which forms an integral part thereof.

Like various reference characters designate like parts in the various figures of the drawing.

BRIEF DESCRIPTION OF THE DRAWING

In the drawing:

Referring now to FIG. 1 of the drawing there is shown a solenoid actuated flapper valve 10 comprising the present invention. In a conventional manner, the valve 10 is provided with leads 12 and 14, one of which is connected to the power source, the other of which is connected to a two position switch 16 which is fully described in my aforementioned issued patent. A compressor motor 18 is connected in a series with the switch 16 and the power source. The two position switch 16 is also electrically connected to the same power source as the compressor motor 18. Operation of the switch 16 (and hence the valve 10) is the same as described in the aforementioned patent and for this reason an additional description will not be made at this time other than to say that in a first mode of operation the compressor motor 18 is actuated and in a second mode of operation the solenoid valve 10 is energized.

Figure 1:
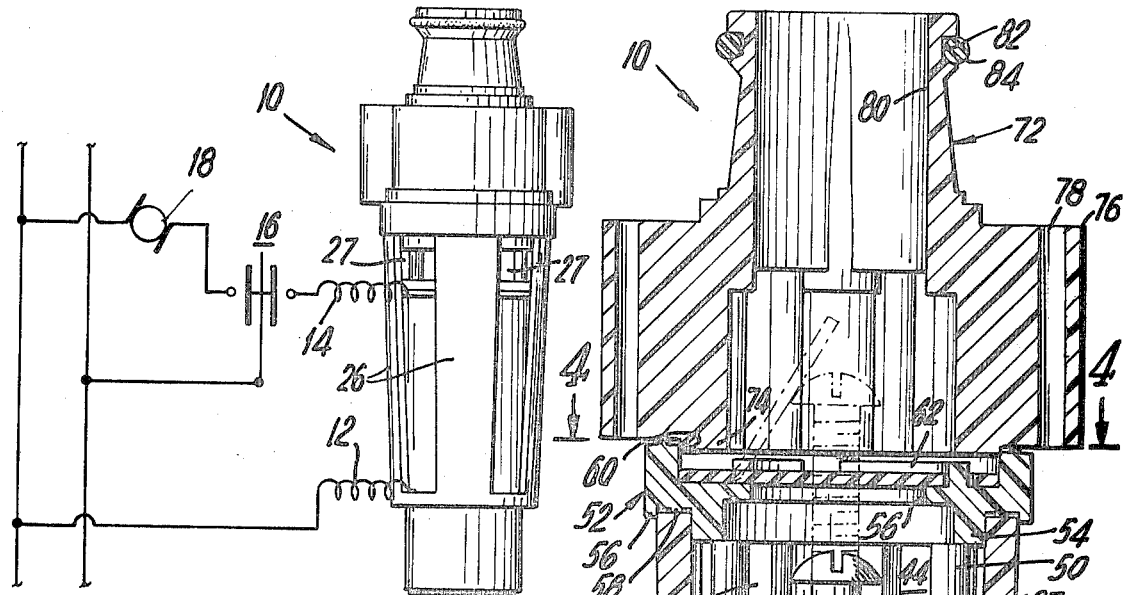
FIG. 1 is a partially schematic elevational view of the solenoid actuated flapper valve, comprising the present invention, the valve being shown in a typical environment.
Figure 2:
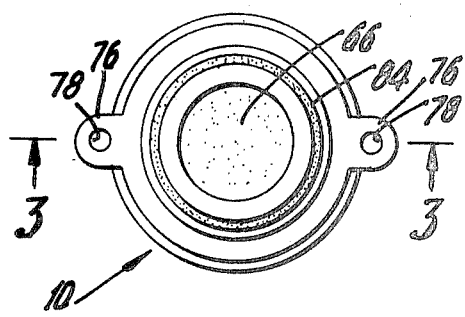
FIG. 2 is a plan view of the flapper valve shown in FIG. 1.
Figure 4:
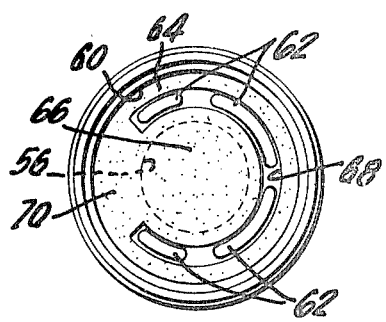
FIG. 4 is a sectional plan view taken along 4—4 of FIG. 3.
Figure 3:
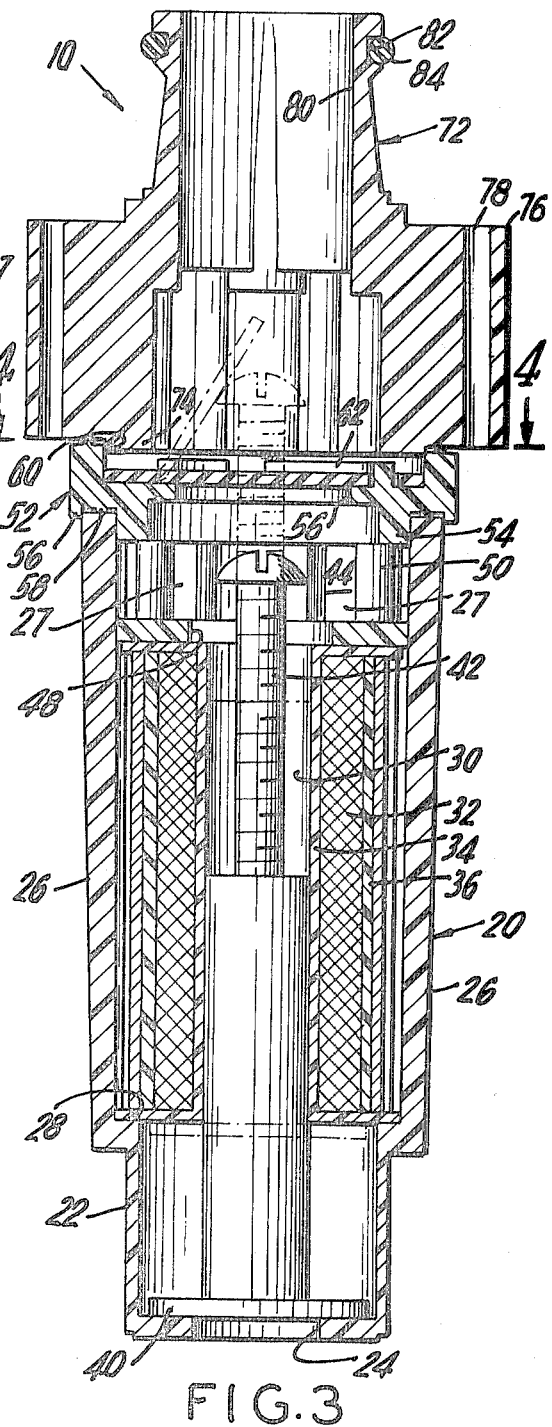
FIG. 3 is a sectional elevational view taken along line 3—3 of FIG. 2.

The construction of the valve 10 may best be seen by reference to FIGS. 3 and 4. The valve 10 is comprised of a lower body portion 20 which includes a tubular base section 22 having a central opening 24 in the bottom wall thereof. Extending upwardly from the tubular section 22 and integrally therewith are a plurality of an angularly spaced, axially disposed legs 26. In the embodiment illustrated there are four equally spaced legs 26 defining a plurality of axially extending slots 27. A transverse or radially extending shoulder 28 is defined by the juncture of the tubular section 22 and the legs 26.

Disposed within the body portion 20 is a solenoid generally designated by the reference character 30. The solenoid consists of a coil 32 wound on an insulating bobbin 34, the external surface of the coil 32 being covered by an insulator material 36. Leads 12 and 14 extend from the coil 32. The lower end of the bobbin 34 rests on the transverse shoulder 28. The solenoid 30 is provided with an axially movable armature 38, the lower end of which is provided with an enlarged diameter 40. At the end of the armature 38 opposite to the disk 40, there is provided an elongated threaded member 42 the function of which will be described hereinafter.

A spacer 44 is provided on the top surface of the bobbin 34 so as to prevent axial movement thereof in a manner which will be described in conjunction with another component of the valve 10. The spacer 44 consists of a disk 46 having a central aperture 48 through which the extension member 42 may pass. Extending upwardly from the disk 46, in an axial direction, are a plurality of angularly spaced posts 50 positioned near the perimeter of the disk 46.

The next element in the assembly is a flapper support plate 52 which is defined by an axially downward extending cylindrical portion 54 the outside diameter of which fits within the inner surface of the legs 26. The lower transverse face of the cylindrical portion 54 abuts and cooperates with the posts 50 of the spacer 44 in order to prevent movement of the bobbin 34 when the solenoid 30 is energized. The plate 52 also includes a central aperture 56 that permits passage of the extension 42 of the solenoid 30. A circumferential, downwardly extending lip 57 is formed on the member 52 in order to capture the outside surface of the legs 26. In addition, the lower transverse face of the member 52, at a point slightly above the cylindrical portion 54 is provided with an annular rib 58 that abuts the top edge of the legs 26. This arrangement provides means for forming an adhesive seal between the members 52 and 26. The upper surface of the plate 52 includes a central recess 60 in which are provided a plurality of arcuate, axially projecting ribs 62. As shown best in FIG. 4 the ribs 62 extend over an arc that is somewhat less than 360° and are angularly spaced from each other.

A flexible flapper 64 is positioned in the recess 60 that is formed in the member 52. The flapper 64 comprises a central portion 66 that is larger in area than and overlays the opening 56 of the member 52. The flapper 64 is also provided with a continuous, arcuate cutout 68 that is less than 360° and which receives the several arcuate ribs 62. The portion 70 of the flapper 64 intermediate the ends of the arcuate cutout or slot 68 defines an integral hinge.

The valve assembly 10 is completed by a mounting member 72 that is provided with a downwardly extending cylindrical portion 74 dimensioned so as to be received in the recess 60 provided in the member 52. A pair of laterally extending ears 76 are each provided with an axially extending opening 78 that permits the valve 10 to be secured to the motor 18 in the same manner described in my aforementioned patent. A central opening 80 in the mounting member 72 provides communication between the utilization device, for example, the bellows shown in my aforementioned patent, and the compressor motor 18. Preferably, the end of the mounting member 72 is tapered and is provided with a groove 82 to receive an ring 84 so that the mounting member may be coupled to a suitable hose.

MODE OF OPERATION

When the compressor motor 18 is running by means of the appropriate actuation of the switch 16 a flow of compressed air will be directed inwardly between slots 27 defined by the angularly spaced legs 26 of the valve 10 and then through the passageway defined by the openings 56 and 80 to the utilization device. In this mode of operation, valve 10 is not utilized as such even though the flapper 64 is displaced by the force of the compressed air. However, when it is necessary to use the reverse mode of operation, that is to evacuate or bleed the bellows as described in my aforementioned patent, the switch 16 is actuated to its alternate position. In this condition of the switch 16, the solenoid 30 of the valve 10 is placed in the circuit which includes the source of electrical energy. The solenoid 30 is thereby energized to longitudinally displace both the armature 38 and the extension member 42.

As may be seen by the phantom outline in FIG. 3, when the extension member 42 is displaced upwardly the flapper 64 is deflected about the hinge 70. This permits discharge of the compressed air from the utilization device through the openings 80 and 56 and then through the spaces 27 between the legs 26. It should be noted that when the switch 16 is in the neutral position and after the bellows have been filled with compressed air, the pressure differential on opposite surfaces of the flapper 64 will maintain the flapper 64 in its closed position over the opening 56 to prevent leakage of air.

From the foregoing it will be evident that an improved, low cost, solenoid actuated flapper valve has been provided. All the components of the valve except the solenoid and the flapper may be inexpensively molded in a high-impact plastic material. The flapper may very inexpensively be made of a suitable material such as rubber, neoprene, or the like. This type of material will assure a long an effective life for both the flapper and the valve. It should be particularly noted that the inherent resiliency of the flapper as well as the gravity return of the armature when it is not energized eliminates the need of any return spring in the solenoid assembly. The cage like construction of the valve body permits a free flow of air through the valve body in both directions. The assembly of the valve components is achieved adhesively using well-known techniques compatible with the plastics used. There are no closed tolerance for any of the valve body components other than those readily achieveable with conventional molding techniques.

There has been disclosed heretofore the best embodiment of the invention contemplated. However, it is to be understood that various changes and modifications may be made thereto without departing from the spirit of the invention.

What I claim is:

1. An electrically operated fluid valve, adapted for use in combination with fluid pressurizing and pressurized fluid-utilizing means, said valve comprising:
    a. a hollow body having passageway means for providing fluid communication between the fluid pressurizing and fluid-utilizing means;
    b. a solenoid disposed within said hollow body and adapted to be energized by a source of electrical power, said solenoid including a movable armature;
    c. flexible flapper means positioned in said passageway means adjacent to and intersecting the path of said armature, said flapper means being displaceable in a first mode of operation by the flow of fluid from the pressurizing means to thereby place the utilizing means in fluid communication with the pressurizing means, said flapper means being displaced in a second mode of operation by said armature when said solenoid is energized to thereby permit bleeding of pressurized fluid from the utilizing means, said flapper means sealing said passageway means for preventing fluid flow from the utilizing means during times other than said first and second modes of operation, said body including a tubular portion having at least one aperture extending through the wall thereof for defining inlet means for said passageway means;
    d. a flapper means support portion having an opening therethrough for defining in part said passageway means; and
    e. a valve mounting portion having an opening therethrough for defining outlet means for said passageway means, and
    f. said tubular portion, said flapper means support portion and said mounting portion being separate elements secured to each other.

2. An electrically operated fluid valve, adapted for use in combination with fluid pressurizing and pressurized fluid-utilizing means, said valve comprising:
    a. a hollow body having passageway means for providing fluid communication between the fluid pressurizing and fluid-utilizing means;
    b. a solenoid disposed within said hollow body and adapted to be energized by a source of electrical power, said solenoid including a movable armature;
    c. flexible flapper means positioned in said passageway means adjacent to and intersecting the path of said armature, said flapper means being displaceable in a first mode of operation by the flow of fluid from the pressurizing means to thereby place the utilizing means in fluid communication with the pressurizing means, said flapper means being displaced in a second mode of operation by said armature when said solenoid is energized to thereby permit bleeding of pressurized fluid from the utilizing means, said flapper means sealing said passageway means for preventing fluid flow from the utilizing means during times other than said first and second modes of operation, said body including a tubular portion having at least one aperture extending through the wall thereof for defining inlet means for said passageway means;
    d. a flapper means support portion having an opening therethrough for defining in part said passageway means; and
    e. a valve mounting portion having an opening therethrough for defining outlet means for said passageway means, and said flapper means support portion is telescoped within and secured to said tubular portion and said mounting portion is telescoped within and secured to said flapper means support portion.

3. An electrically operated fluid valve, adapted for use in combination with fluid pressurizing and pressurized fluid utilizing means, said valve comprising:
    a. a hollow body having passageway means for providing fluid communication between the fluid pressurizing and fluid-utilizing means;
    b. a solenoid disposed within said hollow body and adapted to be energized by a source of electrical power, said solenoid including a movable armature;
    c. flexible flapper means positioned in said passageway means adjacent to and intersecting the path of said armature, said flapper means being displaceable in a first mode of operation by the flow of fluid from the pressurizing means to thereby place the utilizing means in fluid communication with the pressurizing means, said flapper means being displaced in a second mode of operation by said armature when said solenoid is energized to thereby permit bleeding of pressurized fluid from the utilizing means, said flapper means sealing said passageway means for preventing fluid flow from the utilizing means during times other than said first and second modes of operation, said body including a tubular portion having at least one aperture extending through the wall thereof for defining inlet means for said passageway means;

d. a flapper means support portion having an opening therethrough for defining in part said passageway means; and e. a valve mounting portion having an opening therethrough for defining outlet means for said passageway means, and said tubular portion includes an integral shoulder for supporting one end of said solenoid and wherein there is further included an annular spacer extending between the other end of said solenoid and part of said flapper means supporting portion for limiting axial movement of said solenoid.

4. An electrically operated fluid valve, adapted for use in combination with fluid pressurizing and pressurized fluid-utilizing means, said valve comprising:

a. a hollow body having passageway means for providing fluid communication between the fluid pressurizing and fluid-utilizing means;

b. a solenoid disposed within said hollow body and adapted to be energized by a source of electrical power, said solenoid including a movable armature;

c. flexible flapper means positioned in said passageway means adjacent to and intersecting the path of said armature, said flapper means being displacable in a first mode of operation by the flow of fluid from the pressurizing means to thereby place the utilizing means in fluid communication with the pressurizing means, said flapper means being displaced in a second mode of operation by said armature when said solenoid is energized to thereby permit bleeding of pressurized fluid from the utilizing means, said flapper means sealing said passageway means for preventing fluid flow from the utilizing means during times other than said first and second modes of operation, said body including a tubular portion having at least one aperture extending through the wall thereof for defining inlet means for said passageway means;

d. a flapper means support portion having an opening therethrough for defining in part said passageway means; and e. a valve mounting portion having an opening therethrough for defining outlet means for said passageway means, and said flapper means is a disclike member having an arcuate aperture of less than 360° located radially inward of the periphery thereof, said flapper means support portion including means projecting therefrom into said aperture for preventing radial movement of said flapper means, a part of said valve mounting portion abutting the periphery of said disclike member radially outward of said aperture for preventing axial movement of said flapper means.

5. The valve in accordance with claim 4 wherein the portion of said disclike member intermediate the ends of said aperture is a hinge, the area of said disclike member bounded by said aperture and said hinge being greater than the area of the opening in said flapper means support portion and normally positioned thereover.

6. The valve in accordance with claim 4 wherein said projecting means comprise arcuate rib means substantially filling said entire aperture for preventing angular movement of said flapper means.

7. The valve in accordance with claim 1 wherein said armature is linearly moveable.

8. The valve in accordance with claim 6 wherein said armature further includes an axially adjustable extension member in the end thereof adjacent said flapper means.

9. The valve in accordance with claim 8 wherein said extension member is a screw threaded into said armature.

* * * * *